United States Patent [19]
Schwarzinger

[11] Patent Number: 5,274,272
[45] Date of Patent: Dec. 28, 1993

[54] DEVICE FOR SUPPLYING ELECTRICAL ENERGY TO A LOAD

[75] Inventor: Dieter Schwarzinger, Vienna, Austria

[73] Assignee: U.S. Philips Corporation, New York, N.Y.

[21] Appl. No.: 974,037

[22] Filed: Nov. 10, 1992

[30] Foreign Application Priority Data

Nov. 11, 1991 [EP] European Pat. Off. ........ 91202912.1

[51] Int. Cl.⁵ .............................................. H03L 1/00
[52] U.S. Cl. .................... 307/296.3; 307/219; 307/296.4
[58] Field of Search .............. 307/296.3, 296.4, 66, 307/80

[56]  References Cited
U.S. PATENT DOCUMENTS

| | | | |
|---|---|---|---|
| 4,291,266 | 9/1981 | Portmann | 320/2 |
| 4,556,804 | 12/1985 | Dewitt | 307/296.3 |
| 4,704,542 | 11/1987 | Hwang | 307/66 |
| 5,073,837 | 12/1991 | Back | 307/66 |

OTHER PUBLICATIONS

"OM1016 I²C Evaluation Board", See Page 12 The Section Clock/Calendar Publication From Philips Components.

Primary Examiner—John S. Heyman
Assistant Examiner—Shawn Riley
Attorney, Agent, or Firm—Bernard Franzblau

[57] ABSTRACT

A device for energizing a load has first and second input terminals adapted to be connected to first and second poles of a first DC voltage source, third and fourth input terminals adapted to be connected to first and second poles of a second DC voltage source and first and second output terminals for connection to the load. First and second electrical connections connect the first and second input terminals to the first and second output terminals, respectively, third and fourth electrical connections connect the third and fourth input terminals to the first and second output terminals, respectively and a transistor switch is included in at least one of the first and second electrical connections. The switch is connected to one of the first and second input terminals and to the first output terminal and will to establish an electrically conducting path between its first and second electrodes if a first DC voltage source is connected to the first and second input terminals and unless a second DC voltage source producing a voltage exceeding the voltage of the first DC voltage source is connected to the third and fourth input terminals. A selectively conductive element is included in at least one of the third and fourth electrical connections, and is in an electrically conducting state when the second DC voltage source is connected to the third and fourth input terminals with a predetermined polarity and is in a non-conducting state when the second DC voltage source is disconnected and the first DC voltage source is connected to the first and second input terminals. In order to prevent a voltage drop across and a loss of power in the switch, the switch has a control electrode connected directly to that one of the third and fourth input terminals to which the selectively conductive element is connected. The control electrode thereby receives from the input terminal a control voltage for controlling the switch.

14 Claims, 4 Drawing Sheets

DEVICE FOR SUPPLYING ELECTRICAL ENERGY TO A LOAD

BACKGROUND OF INVENTION

This invention relates to a device for supplying electrical energy to a load, comprising:

a) first and second input terminals adapted to be connected to first and second poles of a first DC voltage source;

b) third and fourth input terminals adapted to be connected to first and second poles of a second DC voltage source;

c) first and second output terminals adapted to be connected to the load;

d) first and second electrical connections connecting the first and second input terminals to the first and second output terminals, respectively;

e) third and fourth electrical connections connecting the third and fourth input terminals to the first and second output terminals, respectively;

f) a switch means included in at least one of the first and second electrical connections, said switch means comprising a first electrode connected to one of the first and second input terminals and a second electrode connected to the first output terminal, said switch means being connected to established an electrically conducting path between its first and second electrodes if a first DC voltage source is connected to the first and second input terminals and unless a second DC voltage source producing a voltage exceeding the voltage produced by the said first DC voltage source is connected to the third and fourth input terminals;

g) a selectively conductive element included in at least one of said third and said fourth electrical connections, said selectively conducting element being in an electrically conducting state when the second DC voltage source is connected to the third and fourth input terminals with a predetermined polarity and in a non-conducting state when the second DC voltage source is disconnected and the first DC voltage source is connected to the first and second input terminals.

A device of the kind set forth is disclosed in a publication from Phillips Components with the title "OM1016 I²C Evaluation Board", see page 12 the section "Clock/Calendar". In the known device the switch means is formed by a diode. A disadvantage of this arrangement is that a relatively high voltage drop always occurs over a diode, which causes the useful voltage available for the load to be always below the nominal voltage produced by the first DC voltage source. This is particularly inconvenient when the first DC voltage source produces only a small voltage, e.g. when it is a small battery. In such a case the voltage drop across the diode constitutes a considerable portion of the voltage produced by the voltage source. Moreover, a relatively lot of power is dissipated in such a diode, causing a decrease in the useable capacity of the battery, which is also particularly disadvantageous when the voltage produced by that battery is relatively small.

SUMMARY OF THE INVENTION

It is an object of the invention to provide a device of the kind set forth, in which the disadvantages described above are avoided and in which there is substantially no voltage drop across or power dissipation in the switch means.

The device according to the invention is characterized in that the switch means further comprises a control electrode connected directly to that one of the third and fourth input terminal, to which the selectively conductive element is connected, the control electrode thereby receiving from the said input terminal a control voltage for controlling the switch means. The use of a switch means having a control electrode has the advantage that, when the switch means is made conductive by applying an appropriate voltage to its control electrode, substantially no voltage drop occurs between the first and second electrodes, so that the voltage applied to the load is substantially equal to the voltage produced by the first DC voltage source. Moreover, substantially no power is dissipated in such a switch.

The switch means can comprise substantially every known type of switching device which is provided with a control electrode for causing the path between the first and second electrodes to be electrically conductive when a first signal is applied to it and to be electrically isolating when a second signal is applied to it. A first example of a suitable switch means is an electromagnetic relay. Such a relay constitutes an ideal switch means having zero voltage drop and power loss in the conductive state. On the other hand such a relay is relatively expensive, requires relatively much space even if an extremely miniaturized type is chosen, can be sensitive to mechanical vibrations and has relatively long switching times. Therefore a preferred embodiment of the device according to the invention is characterized in that the switch means comprises a transistor. Compared with a relay a transistor is much less expensive, much smaller, absolutely vibration proof and has very short switching times.

The transistor can be, e.g, a bipolar transistor of the npn- or the pnp-type or any type of field-effect transistor (FET) like a junction FET or a depletion MOSFET. A further preferred embodiment of the device according to the invention is characterized in that the transistor is an enhancement MOSFET included in one of said first and second electrical connections, the control electrode of the switch means being connected to the gate electrode of the MOSFET, said control electrode being further connected, via a resistor, to the other one of said first and second electrical connections. An enhancement MOSFET has an extremely low source-to-drain resistance when it is switched on ($R_{DSon}$), so that the voltage drop across such a device is extremely small. Because of its low $R_{DSon}$ an enhancement MOSFET can carry very high currents. A further important advantage is that, when the first DC voltage source (e.g. a battery) is connected to the load, this MOSFET does not draw any current because it is kept in the conducting state by means of a suitable voltage applied to its gate electrode. Consequently, because no control power is required, this MOSFET does not load the first DC voltage source. Furthermore such an enhancement MOSFET automatically and without additional means provides protection for the load when the first DC voltage source is connected to the first and second input terminals with the wrong polarity. Even when such a wrong connection of the first DC voltage source occurs, the load can still be supplied with power from the second DC voltage source because in that case the blocking of the MOSFET separates only the first (wrongly poled) source from the load without influencing the connection between the second source and the load. An enhancement MOSFET is suitable for use with small supply voltages, e.g. 3 to 5 Volts. Due to the self-blocking properties of such an enhancement MOSFET the first DC voltage source is disconnected from a possibly present second DC voltage source even when some fault prevents the control of the MOSFET via the gate electrode. This prevents a load current from flowing from the second DC voltage source into the first DC voltage source, which is important when the first voltage source is not a rechargeable battery.

Preferably the MOSFET is an N-channel MOSFET included in the first electrical connection, the first input terminal being adapted to be connected to the negative pole of the first DC voltage source. N-channel MOSFETs are relatively inexpensive and for low battery voltages "logic-level" types are available.

A very simple device requiring relatively few components is characterized in that the gate electrode of the MOSFET is connected directly to the third input terminal, the selectively conducting element being a diode connected with its anode to the first output terminal and with its cathode connected to the third input terminal.

For some applications it may be a disadvantage that the voltage drop across the diode causes a voltage difference between the third input terminal and the first output terminal, which is normally connected to ground. The occurrence of a voltage difference of this kind is prevented in a further embodiment of the device according to the invention, which is characterized in that the connection between the gate electrode of the MOSFET and the third input terminal comprises a switching element connected so that it is electrically conductive when the external DC voltage source is connected to the third and fourth input terminals with a predetermined polarity, the selectively conducting element being a diode connected with its anode to the fourth input terminal and with its cathode to the second electrical connection. The diode is now connected between the fourth input terminal and the second electrical connection, where the voltage difference is in many cases less critical.

An embodiment, in which the voltage difference is eliminated substantially completely, is characterized in that the selectively conducting element comprises a transistor having its control electrode connected so that it is electrically conducting only when the second DC voltage source is connected to the third and fourth input terminals with a predetermined polarity. When the transistor is conducting, it causes only a small voltage drop. The transistor can be a bipolar transistor. A further preferred embodiment is characterized in that the transistor is an enhancement MOSFET. When such a MOSFET is conducting, it causes substantially no voltage drop.

A further embodiment, in which no voltage difference is present between the third input terminal and the first output terminal, is characterized in that the MOSFET is a P-channel MOSFET included in the first electrical connection, the first input terminal being adapted to be connected to the positive pole of the first DC voltage source. This embodiment has the advantage that it requires relatively few components, but P-channel MOSFETs are generally more expensive than N-channel MOSFETs.

It could in theory be possible that a short-circuit occurs in the enhancement MOSFET. If that happens, the first DC voltage source could be connected to the external voltage source. In order to prevent even this small risk, a further embodiment of the device according to the invention is characterized in that the switch means comprises two enhancement MOSFETs connected in series.

BRIEF DESCRIPTION OF THE DRAWING

These and other aspects of the invention will be apparent from and will be elucidated with reference to the embodiments shown in the accompanying drawing and described hereinafter.

DESCRIPTION OF THE PREFERRED EMBODIMENTS

Figure 1:
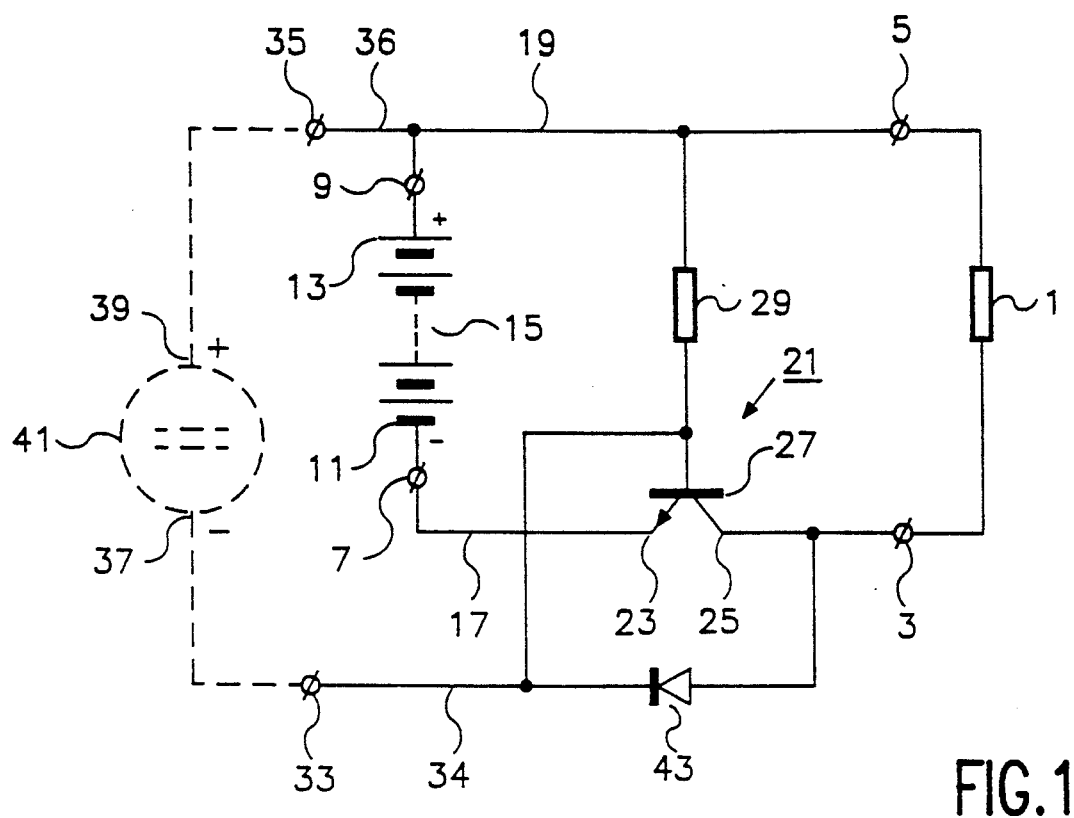
FIGS. 1–7 are circuit diagrams of seven embodiments of the device according to the invention.

Throughout the Figures the same reference numerals have been used for like elements. FIG. 1 shows a circuit diagram of a device for supplying electrical energy to a load 1 (symbolized by a resistor) that can be connected to first and second output terminals 3 and 5. The device comprises first and second input terminals 7 and 9 adapted to be connected to first and second poles 11 and 13 of a first DC voltage source, symbolized by a battery 15. In this embodiment the first input terminal 7 is connected to the negative pole 11 of the battery 15 and the second input terminal 9 to the positive pole 13. First and second electrical connections 17 and 19 connect the first and second input terminals 7 and 9 to the first and second output terminals 3 and 5 respectively. The first electrical connection 17 comprises a switch means 21 which in this embodiment consists of a bipolar transistor of the npn type. The switch means 21 comprises a first electrode 23 (the emitter) that is connected to the first input terminal 7, a second electrode 25 (the collector) that is connected to the first output terminal 3 and a control electrode 27 (the base) that is connected, via a resistor 29, to the second electrical connection 19. The resistance of the resistor 29 is chosen to be much higher than the equivalent resistance of the load 1. The device also comprises third and fourth input terminals 33 and 35 adapted to be connected to first and second poles 37 and 39, respectively, of an external DC voltage source 41 shown in dotted lines. Third and fourth electrical connections 34 and 36 connect the third and fourth input terminals 33 and 35 to the first and second output terminals, respectively. The third electrical connection 34 comprises a diode 43 that acts as a selectively conducting element. The fourth electrical connection 36 partly coincides with the second electrical connection 19. The third input terminal 33 is further connected directly to the control electrode 27 of the switch means 21.

When the battery 15 is connected to the first input terminals 7,9 with the polarity shown in FIG. 1, no external DC voltage source 41 being connected to the third and fourth input terminals 33,35, a base current flows via the resistor 29 and the base-emitter diode of the transistor 21, so that an electrically conductive path is established between the collector 25 and the emitter 23. Current can therefore flow from the positive pole 13, via the load 1 and the transistor 21, to the negative pole 11.

When the external voltage source 41 is connected to the third and fourth input terminals 33 and 35 with the polarity indicated in FIG. 1, the DC voltage produced by that source exceeding the battery voltage, a current will flow from the positive pole 39 via the resistor 29 to the negative pole 37. In this case the base potential of the transistor 21 drops below the emitter potential so that the base current is interrupted and the transistor is blocked. Consequently, the battery 15 cannot be charged by the external voltage source 41 and the load current flows from the positive pole 39 via the load 1 and the diode 43 to the negative pole 37. When the external voltage source 41 is disconnected from the third and fourth input terminals 33,35, the diode 43 is non-conductive allowing the transistor 21 to conduct with a low $V_{CEsat}$.

Instead of an npn-transistor a pnp-transistor can be used for the switch means 21. In that case the first electrical connection 17, which includes the switch means, would be connection between the positive pole of the first DC voltage source 15 and the first output terminal 3, whereas the third electrical connection 34, which includes the selectively conductive element (diode 43), would be the connection between the positive pole of the second DC voltage source 41 and the first output terminal. Such an arrangement has the advantage that a galvanic connection is present between the negative poles of the first and second DC voltage sources 15 and 41, which in some cases is a desirable feature. An advantage of both embodiments is that bipolar transistors are very inexpensive. If suitable transistors are chosen, low saturation voltages are possible. The load 1 is protected against a connection of the first DC voltage source with the wrong polarity because in that case the transistor 21 is blocked. However, this protection is limited to small voltages due to the low breakdown voltage of the base-emitter diode (about 5 V). A disadvantage of using a bipolar transistor is that, in addition to the current supplied to the load 1, the first voltage source 15 must supply the base current to control the transistor.

Figure 2:
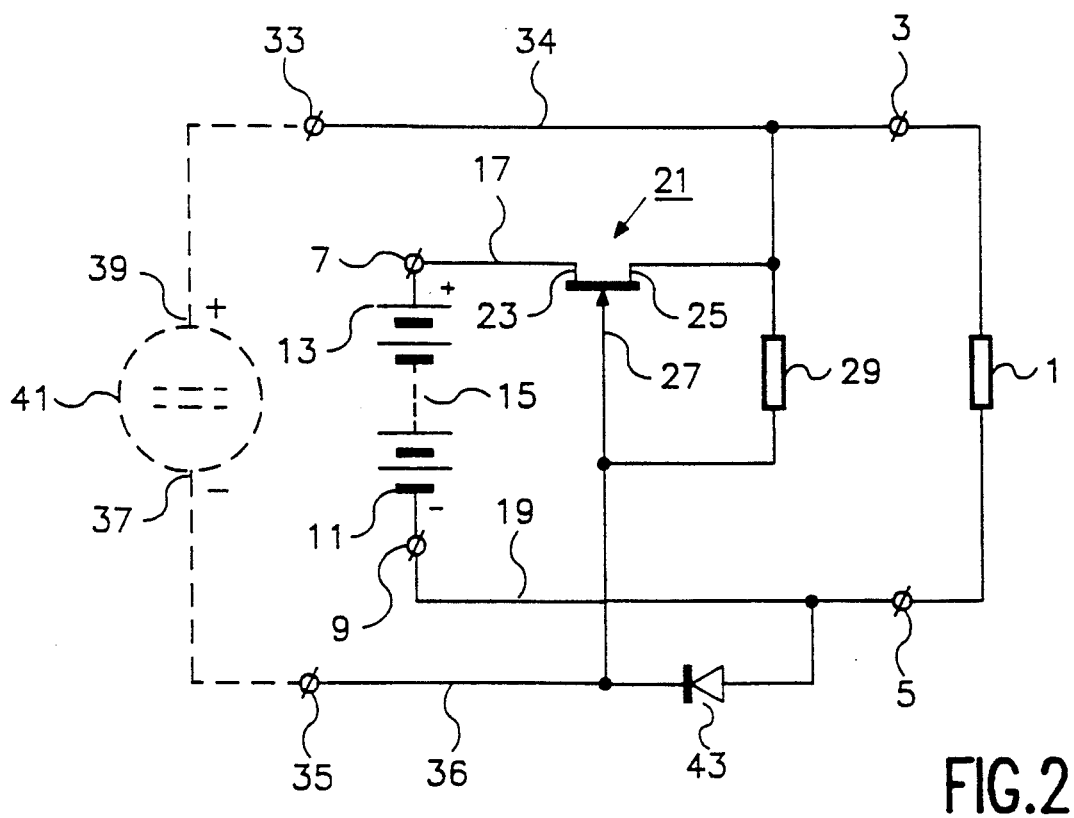

This disadvantage can be avoided by using a field effect transistor (FET) in the switch means 21. FIG. 2 shows an embodiment in which the FET is an n-channel junction FET (JFET), the first electrode 23 being the drain electrode, the second electrode 25 being the source electrode and the control electrode 27 being the gate electrode. A resistor 29 is connected between the source electrode and the gate electrode. A selectively conductive element (diode 43) is included in the fourth electrical connection 36.

When only the first DC voltage source 15 is connected, the gate-source voltage is zero because no current flows via the resistor 29. Consequently, the FET 21 is conductive (JFETs are self-conducting) and a current flows from the positive pole 13 via the drain-source path of the FET 21 and the load 1 to the negative pole 11. When the second DC voltage source 41 is connected as shown in the Figure, a current flows via the resistor 29 causing the control electrode (gate 27) to become negative with respect to the source electrode 25 ($V_{GS}<0$) so that the FET is blocked. Consequently, the first DC voltage source (battery 15) cannot be charged. The load current now flows from the positive pole 39 via the load 1 and the diode 43 to the negative pole 37. When the second DC voltage source is disconnected, the diode 43 prevents a possible flow of current from the positive pole 13 via the drain-source path and the resistor 29 to the negative pole 11. Such a current flow would cause $V_{GS}$ to become negative which could cause the FET to be stabilized in a badly conducting state with a high voltage drop over the FET.

Instead of an n-channel FET as shown in FIG. 2 a p-channel FET can be used for the switch means 21. In that case the first electrical connection, which comprises the FET, must connect the negative pole of the first DC voltage source 15 to the first output terminal 3 and the fourth electrical connection (including the diode 43) must connect the positive pole of the second DC voltage source 41 to the second output terminal 5.

Because JFETs are highly symmetric the drain electrode in FIG. 2 can be used as the second electrode 25 and the source electrode as the first electrode 23, the resistor 29 still being connected between the source electrode and the gate electrode. A similar modification is possible when a p-channel JFET is used.

Figure 3:
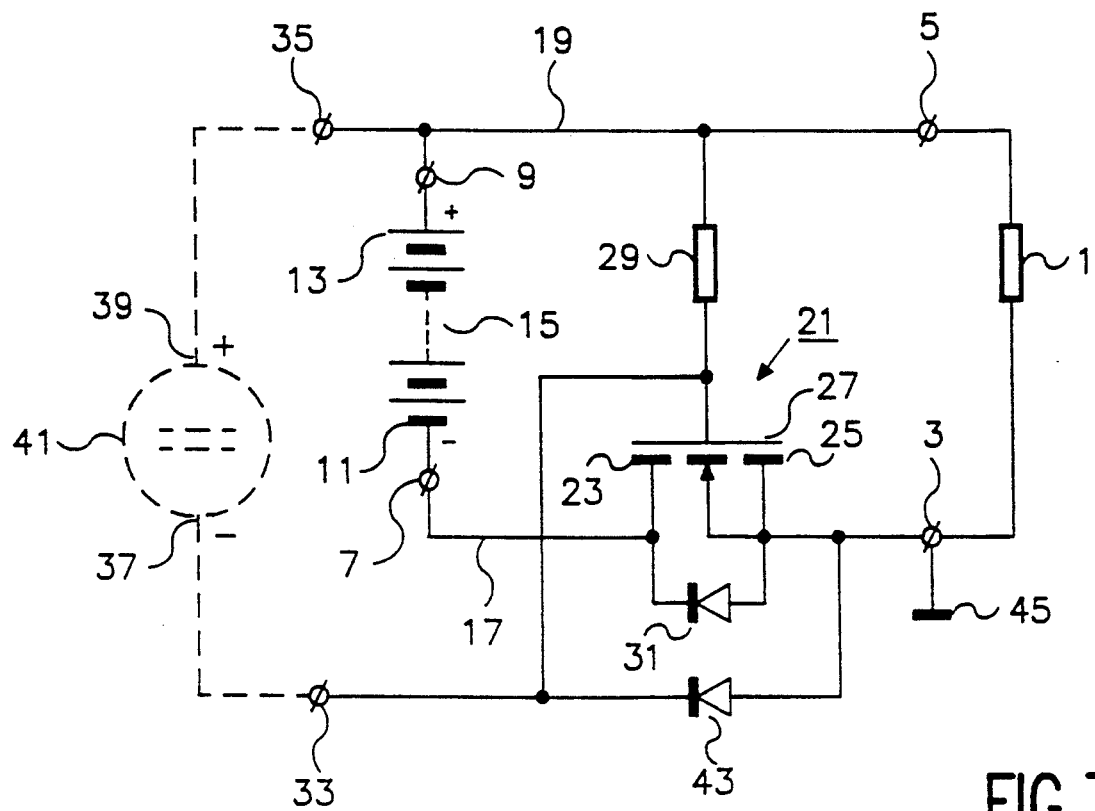

FIG. 3 shows a circuit diagram of an embodiment in which the first electrical connection 17 comprises a switch means 21 which consists of a MOSFET (Metal-Oxide-Semiconductor Field-effect Transistor) of the N-channel type. The first electrode 23 of the switch means (the drain electrode) is connected to the first input terminal 7, the second electrode 25 (the source electrode) is connected to the first output terminal 3 and the control electrode 27 (the gate electrode) is connected, via resistor 29, to the second electrical connection 19. The resistance of the resistor 29 is chosen to be much higher than the equivalent resistance of the load 1. The MOSFET 21 further comprises an integrated protective diode 31. As in the previously described embodiments the device comprises third and fourth input terminals 33 and 35 adapted to be connected to first and second poles 37 and 39, respectively, of an external DC voltage source 41 shown in dotted lines. The third input terminal 33 is connected, via a diode 43 that acts as a selectively conducting element, to the first output terminal 3 and the fourth input terminal 35 is connected to the second electrical connection 19. The third input terminal 33 is further connected directly to the control electrode 27 of the switch means 21.

When the battery 15 is connected to the first input terminals 7,9 with the polarity shown in FIG. 3, no external DC voltage source 41 being connected to the third and fourth input terminals 33,35, at first a current flows from the second input terminal 9 via the load 1 and the integrated protective diode 31 to the first input terminal 7. This current causes a voltage drop over the load 1 representing the positive gate-source voltage $V_{GS}$ of the MOSFET 21. Therefore an electrically conductive path is established between the source electrode 25 and the drain electrode 23. Current can therefore flow from the positive pole 9, via the load 1 and the MOSFET 21, to the negative pole 11. If a MOSFET with a small channel resistance $R_{DSon}$ is chosen, the voltage drop will be very small. Because no power is needed to control the FET, battery capacity is not used when the load 1 is switched off.

If the external voltage source 41 is connected to the third and fourth terminals 33,35 with the polarity indicated in FIG. 3, the DC voltage produced by that source exceeding the battery voltage, the voltage on the gate electrode 27 of the MOSFET 21 will be lowered and $V_{GS}$ will become zero or negative, causing the channel between the source and the drain to become non-conducting. Because the protective diode 31 also is now non-conducting, it is impossible for current to flow out of or into the battery 15. Overloading of the battery, with the possibility of an explosion, is prevented thereby. A current can flow from the positive pole 39 via the load 1 and the diode 43 to the negative pole 37. A negligible parasitic current flows via the resistor 29. The diode 43 is non-conducting when the external voltage source is not connected to the third and fourth terminals 33,35. This prevents the gate electrode 27 from being connected to the source electrode 25. As a consequence of this $V_{GS}$ is positive and the MOSFET 21 is conducting when only the battery 15 is connected with the predetermined polarity. The diode 43 thus acts as a selectively conducting element that is in an electrically conducting state when the external DC voltage source 41 is connected to the third and fourth input terminals 33,35 with the right polarity and in a non-conducting state when the external DC voltage source is disconnected (or connected with the wrong polarity) and the battery 15 is connected to the first and second input terminals 7,9. Without the diode 43 the FET 21 would be blocked if only the battery 15 were connected and the battery current would only be able to flow via the protective diode 31 which would cause a considerable voltage drop. If the battery is inadvertently connected with the wrong polarity the voltage of the drain electrode 23 becomes positive with respect to that of the gate electrode 27 and the source electrode 25, but $V_{GS}$ remains equal to zero and the FET is blocked. Therefore the load 1 is not supplied with a voltage having the wrong polarity. If at the same time the external voltage source 41 is connected, the FET 21 remains non-conducting and the load 1 is supplied with energy from the source 41 in the manner described above. The embodiment shown in FIG. 3 has the advantage that it uses only a small number of components (the FET 21, the diode 43 and the resistor 29) and that the FET is an inexpensive N-channel MOSFET. For some applications it is a disadvantage that due to the diode 43 there is a voltage difference between the negative pole 37 of the voltage source 41 (connected to the third input terminal 33) and the load-connected first output terminal 3 that is usually connected to ground as shown at 45.

Figure 4:
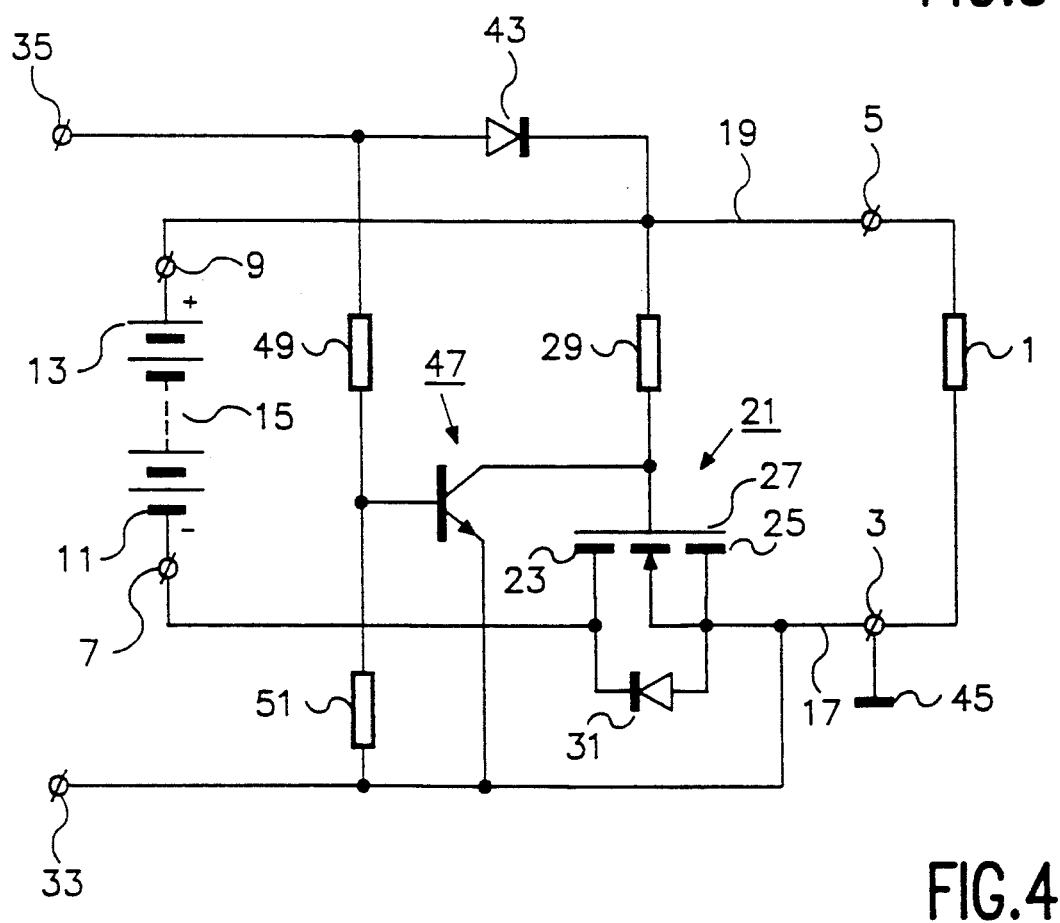

This disadvantage has been eliminated in the embodiment shown in FIG. 4, in which some extra components have been included. In this embodiment the connection between the gate electrode 27 of the MOSFET 21 and the third input terminal 33 comprises a switching element which may be, e.g. an integrated inverter or a FET or bipolar transistor connected as an inverter. In FIG. 4 the switching element is an npn transistor 47 having its collector connected to the gate electrode 27 and its emitter to the third input terminal 33 and to the source electrode 25. The base of the transistor 47 is connected via a resistor 49 to the fourth input terminal 35 and via a resistor 51 to the third input terminal 33. The diode 43 is connected with its anode to the fourth input terminal 35 and with its cathode to the second electrical connection 19.

When the external voltage source 41 (not shown in FIG. 4) is disconnected from the third and fourth input terminals 33,35 the operation is the same as in the embodiment shown in FIG. 3. When the external voltage source 41 is connected with the right polarity the base of the transistor 47 receives a current from the (positive) fourth input terminal 35 via the resistor 49 so that its collector-emitter path becomes conductive and an electric connection is established between the gate electrode 27 and the source electrode 25. Consequently $V_{GS}$ is equal to zero and the MOSFET 21 is blocked, thereby disconnecting the battery 15. The resistor 51 serves to conduct the collector cut-off current $I_{CBO}$. The diode 43 prevents the gate electrode 27 from being connected to the source electrode 25 via the resistors 49 and 51 and the direct connection between the third input terminal 33 and the first output terminal 3. It also prevents the flow of a current through the load 1 when the external voltage source is connected with the wrong polarity. When this source is connected with the right polarity a current flows from the fourth input terminal 35 via the diode 43 and the load 1 to the third input terminal 33. Due to the direct connection between the grounded first output terminal 3 and the third input terminal 33 the latter is also grounded.

Figure 5:
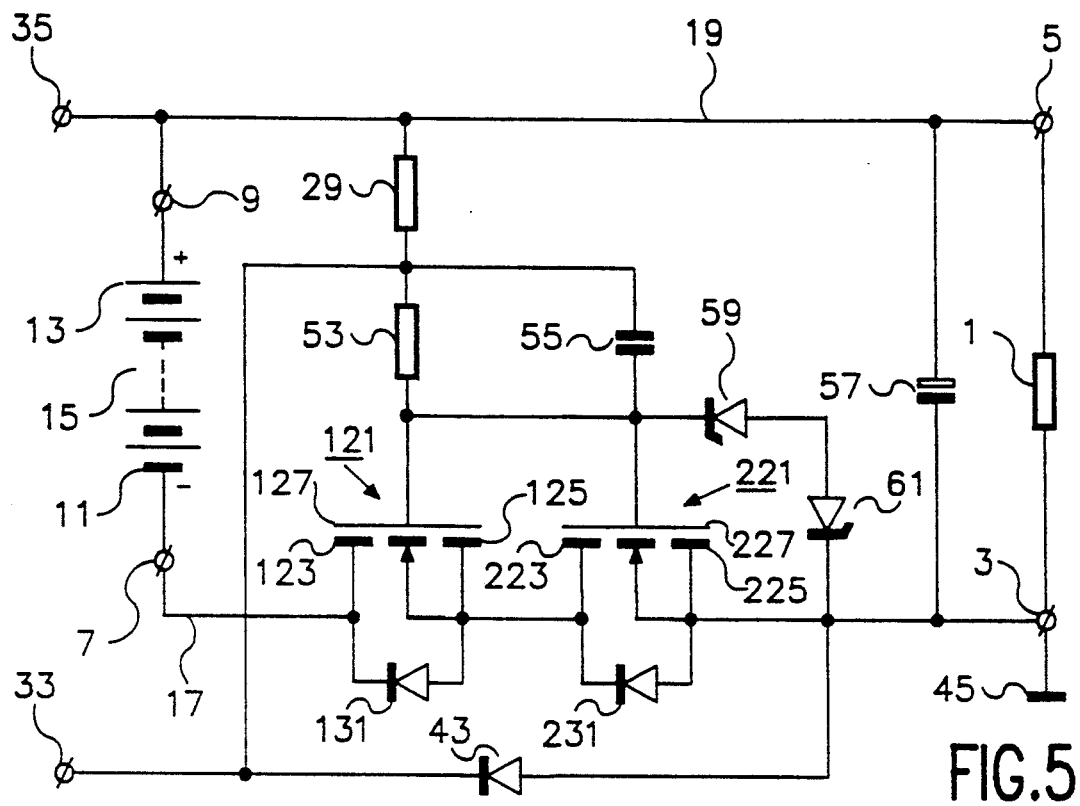

In some safety regulations it is specified that when batteries are protected against unallowed charging by means of semiconductors, at least two semiconductor devices must be used because there is always a possibility of the failure (including a short-circuit) of a semiconductor device. An embodiment which meets this requirement is shown in FIG. 5. This embodiment operates in substantially the same manner as the embodiment shown in FIG. 3, but instead of the single MOSFET 21 two MOSFETs 121 and 221 connected in series are used. The source electrode 125 of the first MOSFET 121 is connected to the drain electrode 223 of the second MOSFET 221 which has its source electrode 225 connected to the first output terminal 3. The drain electrode 123 of the first MOSFET 121 is connected to the first input terminal 7 and the two gate electrodes 127 and 227 are connected to the resistor 29 and to the third input terminal 33 via a parallel connection of a resistor 53 and a capacitor 55.

In case of a short-circuit between e.g. the gate and the drain-source channel of the first MOSFET 121 a charging current could flow from the fourth input terminal 35 via the battery 15, the short-circuited first MOSFET 121 and the resistor 53 to the third input terminal 33. Therefore the resistance of the resistor 53 must be chosen such that this charging current of the battery is always below the allowed maximum value for the type of battery that is used. In practice resistance values in the order of magnitude of 100 k$\Omega$ give the desired result. When the external voltage source 41 (not shown in FIG. 5) is connected to or disconnected from the third and fourth input terminals 33,35 the gate capacitances of the FETs (typically about 500 pF for each FET) must be charged or discharged via the resistor 53. Due to the RC time constant (100 k$\Omega$*1000 pF=100 $\mu$s) this charging causes short interruptions in the supply of energy to the load 1. The capacitor 55 serves to decrease the effective time constant so that the duration of the interruption is as short as possible. Nevertheless it may be found useful to connect an electrolytic capacitor 57 parallel to the load 1 to act as a buffer. A series connection of two zener diodes 59 and 61 between the gate electrodes 127,227 and ground 45 serves to protect the gates against voltage peaks in case of electrostatic discharges.

Figure 6:
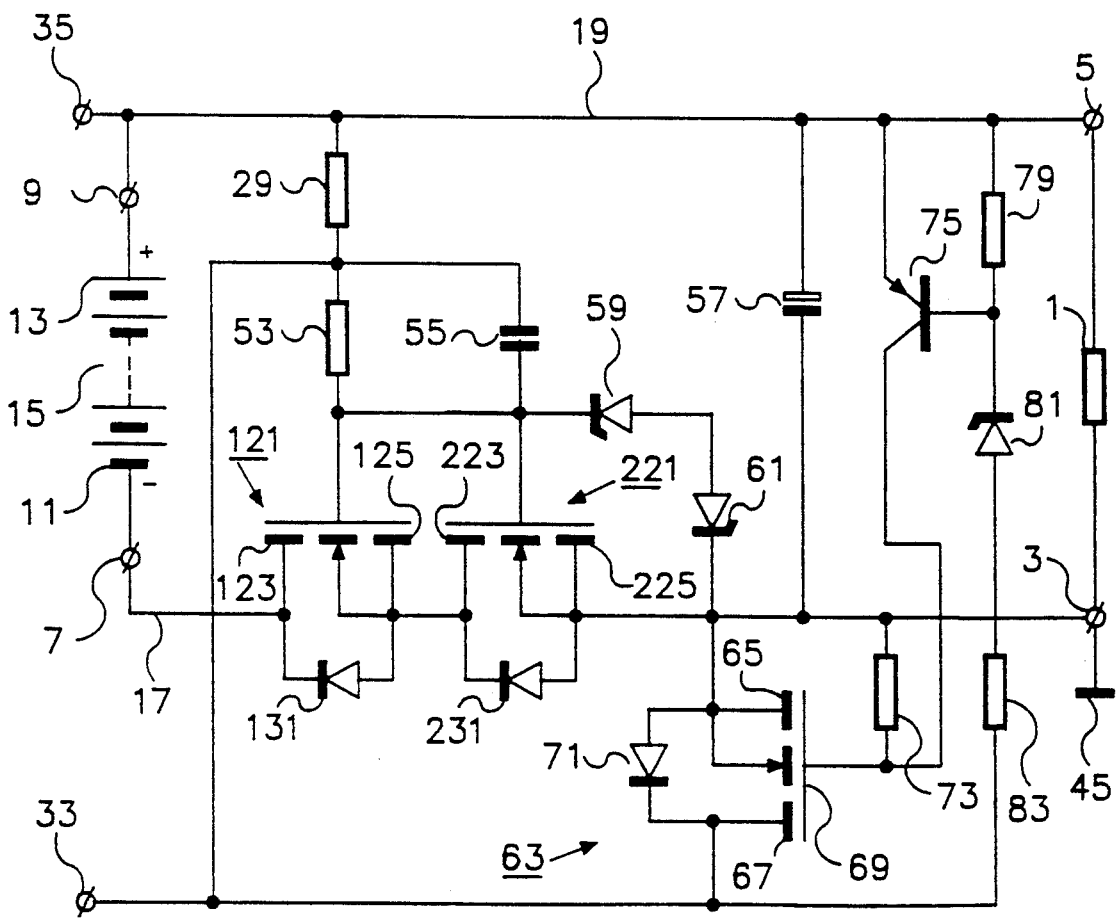

FIG. 6 shows a modification of the circuit shown in FIG. 5, in which a voltage drop between the third input terminal 33 and the ground connection 45 is avoided when the external voltage source 41 (not shown in FIG. 6) is connected to the third and fourth input terminals 33,35. In this embodiment an N-channel MOSFET 63 having a source electrode 65, a drain electrode 67, a gate electrode 69 and an integrated protective diode 71 is connected between the first output terminal 3 and the third input terminal 33. Its gate electrode 69 is connected via a resistor 73 to the first output terminal 3 and via the emitter-collector path of a pnp transistor 75 to the second electrical connection 19. The base of the transistor 75 is connected via a resistor 79 to the second electrical connection 19 and via a series connection of a zener diode 81 and a resistor 83 to the third input terminal 33.

When only the battery 15 is connected, the FET 63 is blocked because the connection between the source electrode 65 and the gate electrode 69 via the resistor 73 causes $V_{GS}$ to be equal to zero. The transistor 75 is also blocked because no base current can flow via the zener diode 81, the resistor 83 and the FET 63. The resistor 79 serves to conduct the $I_{CBO}$ of the transistor 75. The FETs 121 and 221 are kept in the conducting state via the resistors 29 and 53 and the load current flows from the positive pole 13 of the battery 15 via the load 1 and the conducting FETs 221 and 121 back to the negative pole 11. When the external voltage source 41 is connected the FETs 121 and 221 are blocked via the resistor 53 so that the battery 15 is effectively disconnected. At the same time the transistor 75 receives a base current via the zener diode 81 and the resistor 83, so that its emitter-collector path starts to conduct, thereby connecting the gate electrode 69 of the FET 63 to the (positive) fourth input terminal 35. This causes the FET 63 to become conducting. The load current now flows from the fourth input terminal 35 via the load 1 and without a loss of voltage via the FET 63 to the third input terminal 33. Consequently the potential of the third input terminal 33 is substantially equal to ground potential.

Figure 7:
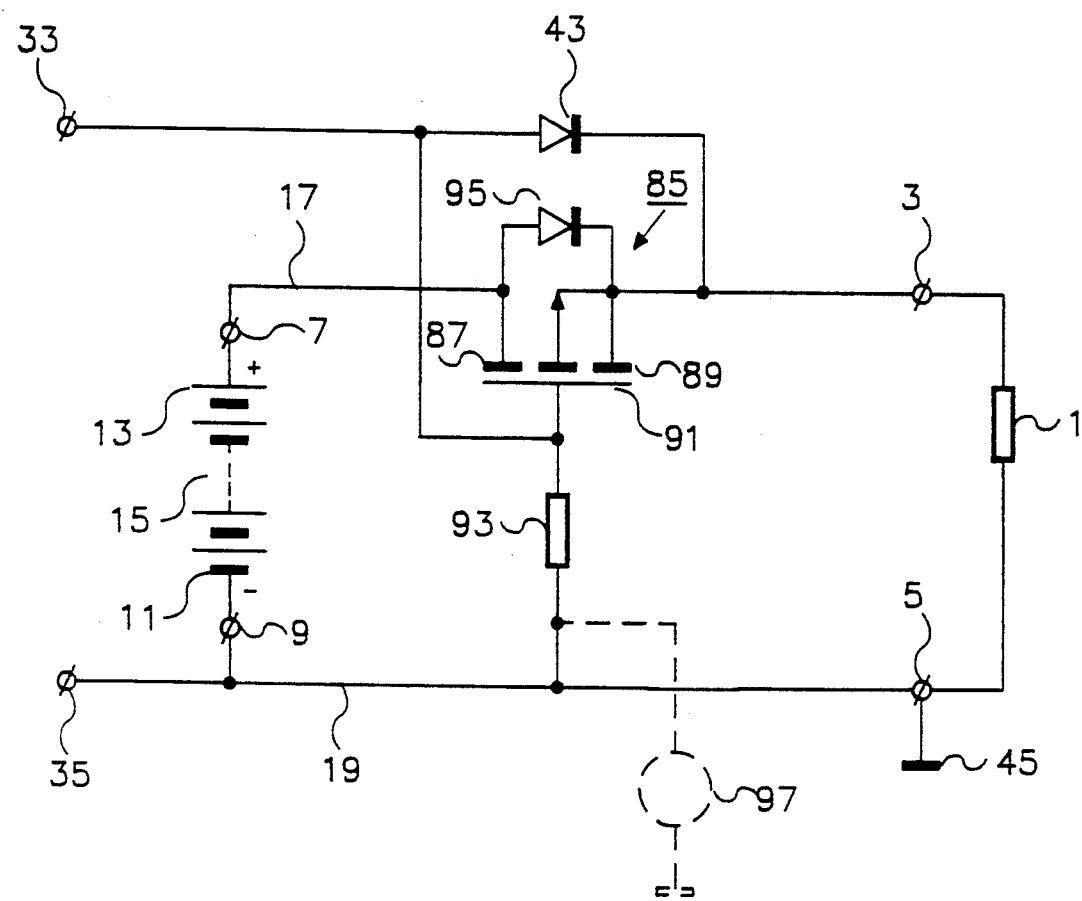

FIG. 7 shows an embodiment in which a voltage difference between the third input terminal 33 and the ground connection 45 has been avoided with the use of a very small number of components. In this embodiment the first input terminal 7 is to be connected to the positive pole 13 of the battery 15, the first electrical connection 17 connecting this first input terminal to the (positive) first output terminal 3. The switch means included in the first electrical connection is a P-channel MOSFET 85 having a drain electrode 87 connected to the first input terminal 7, a source electrode 89 connected to the first output terminal 3, a gate electrode 91 connected to the third input terminal 33 and, via a resistor 93, to the second electrical connection 19. The MOSFET 85 further comprises an integrated protective diode 95. The diode 43, which acts as a selectively conducting element, is connected between the source electrode 89 and the third input terminal 33.

The operation of the circuit shown in FIG. 7 is substantially the same as that of the circuit shown in FIG. 3. The disconnection of the battery 15 is in this embodiment performed in the positive electrical connection 17, using the P-channel MOSFET 85 as a switch means. Therefore the polarities of the FET are reversed and the FET requires a negative $V_{GS}$ to become conductive. Because P-doped semiconductor material has a smaller conductivity than N-doped material, larger crystals are necessary which causes P-channel FETs to be more expensive. Also "logic-level" types are practically not available so that for low battery voltages it may be necessary to connect the resistor 93 to a negative auxiliary voltage source 97 (shown in dotted lines) instead of to ground.

It will be clear that modifications of the described embodiments are possible. For example, in the embodiments shown in FIGS. 4 and 7 a series connection of two (or more) FETs as shown in FIGS. 5 and 6 could be used and the transistors 47 and 75 could be replaced by other types, e.g. FETs.

I claim:

1. A device for supplying electrical energy to a load comprising:
   a) first and second input terminals adapted to be connected to first and second poles of a first DC voltage source;
   b) third and fourth input terminals adapted to be connected to first and second poles of a second DC voltage source;
   c) first and second output terminals adapted to be connected to the load;
   d) first and second electrical connections connecting the first and second input terminals to the first and second output terminals, respectively;
   e) third and fourth electrical connections connecting the third and fourth input terminals to the first and second output terminals, respectively;
   f) a switch means included in at least one of the first and second electrical connections, said switch means comprising a first electrode connected to one of the first and second input terminals and a second electrode connected to one of the first and second output terminals, said switch means being connected to establish an electrically conducting path between its first and second electrodes if a first DC voltage source is connected to the first and second input terminals and unless a second DC voltage source producing a voltage exceeding the voltage produced by said first DC voltage source is connected to the third and fourth input terminals;
   g) a selectively conductive element included in at least one of said third and fourth electrical connections, said selectively conducting element being in an electrically conducting state when the second DC voltage source is connected to the third and fourth input terminals with a predetermined polarity and in a non-conducting state when the second DC voltage source is disconnected and the first DC voltage source is connected to the first and second input terminals, and means directly connecting a control electrode of the switch means to that one of the third and fourth input terminals to which the selectively conductive element is connected whereby the control electrode receives from said one input terminal a control voltage for controlling the switch means.

2. A device as claimed in claim 1, wherein the switch means comprises a transistor.

3. A device as claimed in claim 2, the transistor comprises an enhancement MOSFET included in one of said first and second electrical connections, the control electrode of the switch means being the gate electrode of the MOSFET, said control electrode being further connected, via a resistor, to the other one of said first and second electrical connections.

4. A device as claimed in claim 3, wherein said MOSFET is an N-channel MOSFET included in the first electrical connection, the first input terminal being adapted to be connected to the negative pole of the first DC voltage source.

5. A device as claimed in claim 4, wherein the gate electrode of said MOSFET is connected directly to the third input terminal, the selectively conducting element being a diode having its anode connected to the first output terminal and its cathode connected to the third input terminal.

6. A device as claimed in claim 4, wherein a switching element is connected between the gate electrode of said MOSFET and the third input terminal so that it is electrically conductive when the second DC voltage source is connected to the third and fourth input terminals with a predetermined polarity, the selectively conducting element being a diode with its anode connected to the fourth input terminal and with its cathode connected to the second electrical connection.

7. A device as claimed in claim 1, wherein the selectively conducting element comprises a transistor having its control electrode connected so that it is electrically conducting only when the second DC voltage source is connected to the third and fourth input terminals with a predetermined polarity.

8. A device as claimed in claim 7, wherein the transistor is an enhancement MOSFET.

9. A device as claimed in claim 3, wherein the said MOSFET is a P-channel MOSFET included in the first electrical connection, the first input terminal being adapted to be connected to the positive pole of the first DC voltage source.

10. A device as claimed in claim 3, wherein the switch means comprises two enhancement MOSFETs connected in series.

11. A device as claimed in claim 5, wherein the switch means comprises two enhancement MOSFETs connected in series.

12. A device as claimed in claim 7, wherein the switch means comprises two enhancement MOSFETs connected in series.

13. A device as claimed in claim 1 wherein the switch means comprises a field effect transistor (FET), the selectively conductive element comprises a diode and said directly connecting means comprises a resistor coupling the control electrode of the FET to that one of the third and fourth input terminals via said diode, and a switching element coupling said control electrode to the third input terminal so that it conducts when the second DC voltage source is connected to the third and fourth input terminal with a predetermined polarity.

14. A device as claimed in claim 1 wherein the switch means comprises a field effect transistor (FET), and further comprising a resistor coupled between a control electrode and a source electrode of the FET.

* * * * *